United States Patent [19]
Miller et al.

[11] 3,950,696
[45] Apr. 13, 1976

[54] TRAPEZOIDAL COIL CONFIGURATION FOR METAL DETECTOR IN THE SHAPE OF AN INVERTED U

[75] Inventors: Robert C. Miller; George T. Mallick, both of Pittsburgh, Pa.

[73] Assignee: Westinghouse Electric Corporation, Pittsburgh, Pa.

[22] Filed: Jan. 2, 1975

[21] Appl. No.: 538,067

Related U.S. Application Data

[63] Continuation-in-part of Ser. No. 465,448, April 29, 1974, abandoned, which is a continuation of Ser. No. 322,830, Jan. 18, 1973, abandoned.

[52] U.S. Cl. .............................. 324/41; 340/258 C
[51] Int. Cl.² ...................................... G01R 33/00
[58] Field of Search ....... 324/41; 340/258 R, 258 C, 340/258 D

[56] References Cited
UNITED STATES PATENTS

| | | |
|---|---|---|
| 2,147,746 | 2/1939 | Luck et al. .................... 340/258 C |
| 2,338,793 | 1/1944 | Zuschlag ............................... 324/41 |
| 3,588,685 | 6/1971 | Fallenius .............................. 324/41 |
| 3,697,972 | 10/1972 | Brown .................................. 324/41 |

FOREIGN PATENTS OR APPLICATIONS

| | | |
|---|---|---|
| 827,527 | 2/1960 | United Kingdom .................. 324/41 |
| 895,089 | 5/1962 | United Kingdom .................. 324/41 |

*Primary Examiner*—Robert J. Corcoran
*Attorney, Agent, or Firm*—M. P. Lynch

[57] ABSTRACT

The invention relates to a trapezoidal, ladder-type coil configuration positioned as an inverted U to provide a passage thereunder for use in conjunction with magnetic field generating and magnetic field measuring circuitry to detect the presence of metal devices associated with objects, i.e., parcels or persons, passing through the passage. The ladder configuration of the coil establishes magnetic fields within the passage which exhibit sufficiently strong components in three orthogonal directions ($x$, $y$ and $z$) to assure detection of metal devices regardless of the orientation of the metal devices.

7 Claims, 8 Drawing Figures

TRAPEZOIDAL COIL CONFIGURATION FOR METAL DETECTOR IN THE SHAPE OF AN INVERTED U

This application is a continuation-in-part application of U.S. patent application, Coil Configuration For Metal Detector Serial No. 465,448, filed Apr. 29, 1974 by the inventors of the subject application which in turn was a continuation of application Ser. No. 322,830, filed Jan. 18, 1973, both of which have been abandoned.

BACKGROUND OF THE INVENTION

In the widespread use of metal detecting devices for numerous applications, especially the more recent applications of metal detectors in security systems for monitoring airline passengers to determine the presence of concealed weapons, there exists a need to improve current systems to assure reliable, rapid screening of the subjects of interest. In U.S. Pat. No. 3,686,564 issued Aug. 22, 1972, entitled "Multiple Frequency Magnetic Field Technique for Differentiating Between Classes of Metal Objects", filed Oct. 8, 1970, by G. T. Mallick, R. C. Miller and W. J. Carr, Jr. and assigned to the assignee of the present invention, there is disclosed a weapon detector utilizing a passenger walk-through passageway comprising $x$, $y$ and $z$ coil elements positioned in the top and bottom walls, the two side walls and around the entrance and exit openings of the passageway. One disadvantage of this multiple coil arrangement is that the coil positioned in the bottom of the passageway is sensitive to the metal shank portion of the shoes worn by individuals passing through the passageway. Furthermore, while the coil arrangement in the above-identified U.S. Patent provides coupling with concealed weapons substantially regardless of orientation of the weapons, the requirements for a plurality of individual coils positioned at various locations in the passageway results in a relatively complex coil arrangement.

SUMMARY OF THE INVENTION

A computer analysis of the requirement for uniform magnetic fields in the $x$, $y$ and $z$ directions within a passageway to provide the reliable detection of metal devices regardless of orientation, resulted in the design of a ladder-type coil configuration which extends up one side of the passageway and down the opposite side of the passageway and eliminates the need for coil elements in the bottom of the passageway. This ladder-type coil configuration not only provides desired sensitivity to metal objects regardless of orientation, but eliminates the adverse response to coupling to the steel contained in shoes worn by individuals passing through the passageway.

The ladder-type coil configuration is easier to wind than the coil configuration disclosed in the above-identified U.S. Patent and is of a geometry which facilitates the manufacture of the passageway.

DESCRIPTION OF THE DRAWINGS

The invention will become more readily apparent from the following exemplary description in connection with the accompanying drawings.

DESCRIPTION OF THE PREFERRED EMBODIMENT

Figures 1, 2:
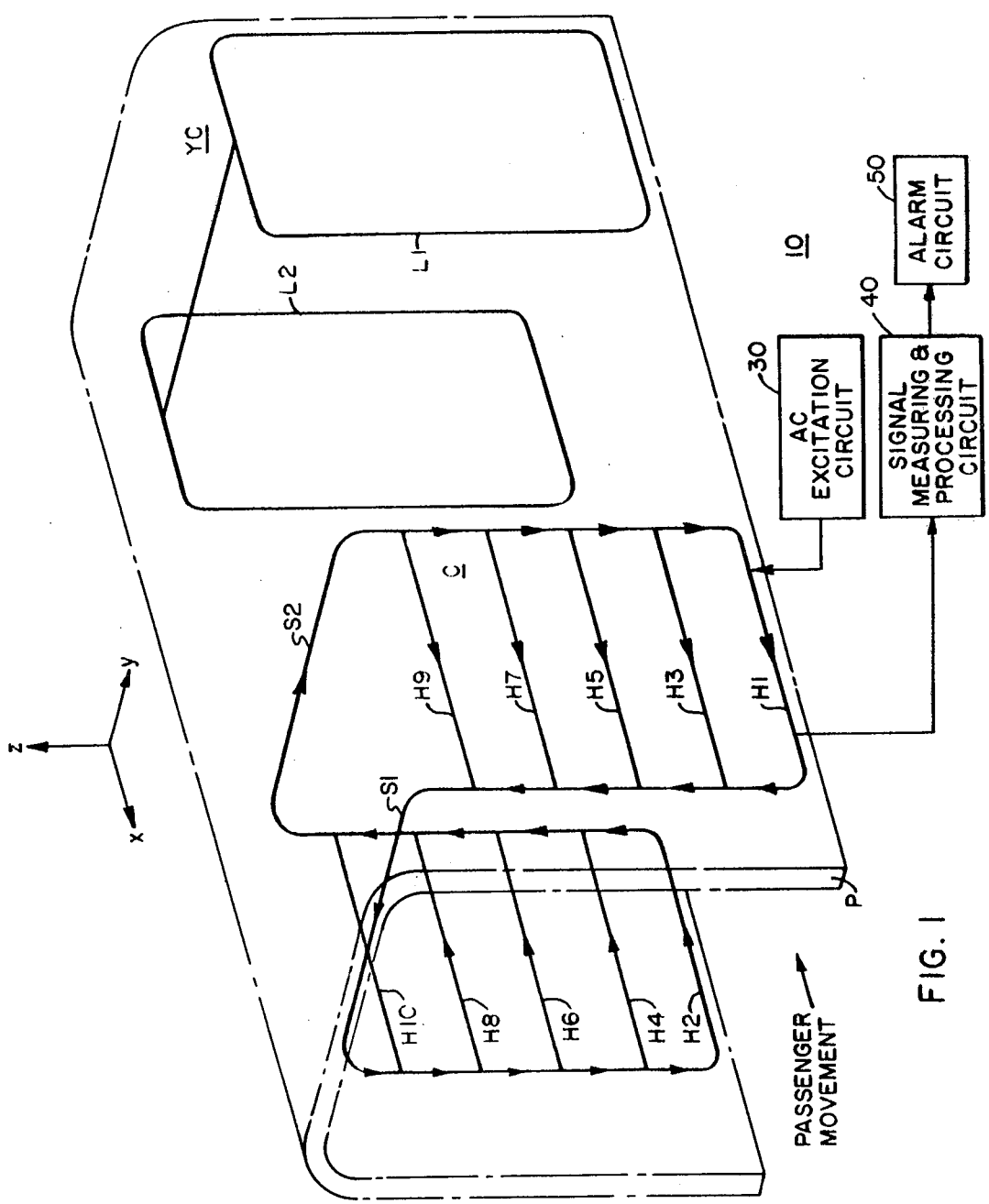
FIG. 1 is a schematic illustration of the application of the invention to a weapon detector.
FIGS. 2–5 are schematic illustrations of variations of the coil configuration incorporated in the embodiment of FIG. 1.

Referring to FIG. 1, there is illustrated schematically a weapon detection station 10 for monitoring passengers boarding aircraft to determine the presence of concealed weapons, i.e., guns. Detection station 10 includes an inverted U-shaped passage structure P and a correspondingly inverted U-shaped magnetic coil configuration C extending up one side wall of the passage structure P, across the top and extending down the opposite side wall of the passage structure. The coil configuration C is in the form of a ladder having sides S1 and S2 and horizontal elements H1, H3, H5, H7 and H9 extending between the sides S1 and S2 in one wall of the passage structure P and horizontal elements H2, H4, H6, H8 and H10 extending between the side elements S1 and S2 in the opposite wall of the passage structure P. The coil configuration C consists of primary and secondary windings jointly wound in a continuous manner as illustrated in FIG. 2. An AC excitation circuit 30 is operatively connected to the primary winding of the coil configuration C and establishes a current flow in the coil configuration C as indicated by the arrows. A signal measuring and processing circuit 40 is operatively connected to the secondary winding of the coil configuration C to monitor the induced magnetic fields resulting from the presence of a metallic object within the passage structure P. If the induced magnetic field generated by the metallic object corresponds to that attributed to a metallic object of interest, i.e., a gun, the signal measuring and processing circuit 40 transmits an activating signal to alarm circuit 50. A detailed description of the implementation and operation of the AC excitation circuit 30, the signal measuring and processing circuit 40 and alarm circuit 50 is provided in the above-identified U.S. patent. Inasmuch as the operation and implementation of the circuits 30, 40 and 50 is provided in the referenced U.S. patent, such description will not be restated herein.

Referring to FIG. 2, the ladder coil configuration C of FIG. 1 is shown extended in a flat position to illustrate the rectangular coil sections comprising the ladder coil configuration C. Each rectangular coil section includes primary and secondary windings of one or more turns. A combination of primary and secondary windings are wound to form the inner rectangular coil section defined by the side elements S1 and S2 and the ladder elements H9 and H10. An example of a suitable combination of primary and secondary windings is that of bifilar windings. Then the primary and secondary windings are wound to form a slightly larger second rectangular loop defined by the side elements S1 and S2 and the ladder elements H7 and H8. This winding process of the primary and secondary is continued until a number of rectangular coil sections are formed to provide an adequate number of ladder elements to produce the necessary magnetic fields which in the embodiment illustrated consists of ladder elements H1–H10. It is obvious that while a number of primary and secondary turns in the ladder elements of each rectangular coil section are equal, the number of windings in the individual rectangular coil sections can vary. Thus while the rectangular coil segments are schematically illustrated as solid lines for the purposes of convenience, it is apparent that the number of turns of primary and secondary forming the respective rectangular coil sections is a matter of design choice.

While the coil configuration C illustrated in FIGS. 1 and 2 consists of a continuous primary and secondary with the primary terminating at the AC excitation circuit 30 and the secondary terminating at the signal measuring and processing circuit 40, it is apparent that the coil configuration C could consist of independent rectangular coil sections each having independent primary and secondary windings terminating at separate excitation and measuring circuits.

The coil segment S1 adjacent to the entrance of the passage structure P functions to establish an $x$ magnetic field in one direction, for example in a direction coresponding to the passenger movement through the structure P, while the coil segment S2 produces an $x$ magnetic field in a direction opposite to the $x$ magnetic field developed by the coil segment S1. The absence of the continuation of coil segments S1 and S2 in the floor of the passage structure P essentially eliminates an $x$ magnetic field at the center of the floor, thus minimizing the effect of metal associated with the shoes of passengers moving through the structure P. The strength of the $x$ magnetic fields produced by the coil segments S1 and S2 increases vertically from the floor to the top of the structure P. Thus, as a passenger enters the passage structure P, he is subjected to an $x$ magnetic field in one direction which essentially diminishes to zero at the midpoint of the passage structure P due to the opposing effect of the $x$ magnetic field developed by the coil segment S2. As the passenger continues beyond the midpoint to the exit of the passage structure P, the $x$ magnetic field produced by the coil segment S2 increases to a maximum at the passageway location adjacent to the coil segment S2. Only one of the $x$ magnetic fields is required for the operation of system 10, the coil segments producing the other $x$ magnetic field and used to maintain the horizontal coil segments in proper alignment and to provide a return path for the coil windings.

The current flow through the horizontal coil segments H1–H9 and H2–H10 produces a vertical or $z$ magnetic field. In a passage structure P of suitable height to accommodate passengers, a plurality of horizontal members illustrated in FIG. 1 to consist of horizontal members H1 to H10 are utilized to provide a relatively uniform $z$ magnetic field. The application of the coil configuration C for monitoring parcels wherein a passageway structure P having a height dimension considerably less than that required for monitoring passengers would require fewer horizontal members to provide the desirable uniform $z$ magnetic field. Experimental evaluation of the ladder-type coil configuration C in a passageway approximately seven feet high and three feet wide indicates that a uniform $z$ magnetic field can be achieved through the use of horizontal coil segments approximately 24 inches in length at vertical spacings of approximately 12 inches. The ladder-type coil configuration C provides a coil arrangement which will produce both an $x$ and $z$ magnetic field, thus eliminating the need for separate operatively isolated $x$ and $z$ coil configurations. Furthermore, the coil configuration C permits the use of a single AC excitation circuit 30 for energizing the coil configuration to produce both the $x$ and $z$ magnetic fields. This is in contrast to the coil configuration disclosed in the above-referenced U.S. patent wherein a separate AC excitation circuit is required for each orthogonal coil configuration positioned about a common volume of the passageway P. There is further illustrated in FIG. 1 a coil configuration YC comprised of oppositely disposed coil loops L1 and L2 positioned in the side walls of the passage structure P to produce a $y$ magnetic field. The combination of the coil configurations C and YC provide the necessary $x$, $y$ and $z$ magnetic fields required to detect the presence of a metal object within the passageway P regardless of the orientation of the metal object.

Figure 3:
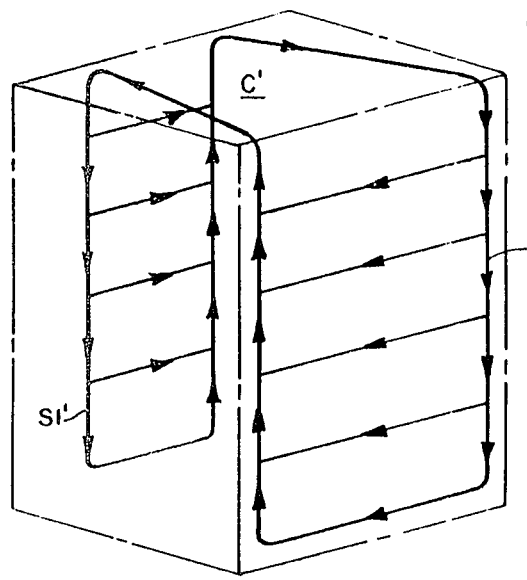
Figure 4A:
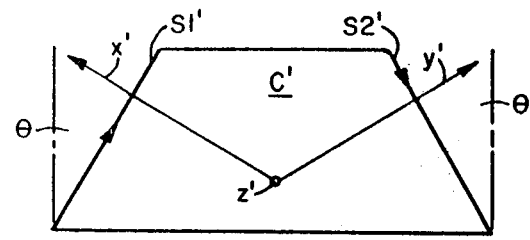
Figure 4B:
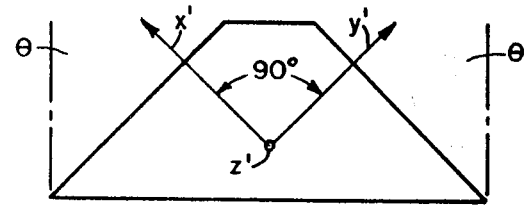

While the ladder coil configuration C illustrated in FIG. 1 provides a coil configuration for developing both the $x$ and $z$ magnetic fields, there is illustrated schematically in FIGS. 3, 4A and 4B a ladder coil configuration capable of developing $x$, $y$ and $z$ magnetic fields.

The coil configuration C' of FIG. 3 differs from the coil configuration C of FIGS. 1 and 2 in that the coil segments are trapezoidal in shape rather than rectangular such that the vertical plane defined by side elements S1' and S2' which form entrance and exit arches of the passageway are no longer parallel.

A top view of the coil configuration C' is illustrated in FIG. 4A. It has been determined experimentally that if the trapezoidal coil segments joining coil configuration C' are such that the angle $\theta$ is greater than zero but less than 90°, then the totally opposed $x$ magnetic fields of FIG. 1 do not exist, but rather $x'$ and $y'$ fields are produced which are perpendicular to the planes defined by side elements S1' and S2' respectively. It has been further determined that the optimum magnetic field strength in the $x'$ and $y'$ direction is achieved when the angle $\theta$ is approximately 45°.

This is apparent when it is considered that the magnetic field generated by the various coil segments is defined to be perpendicular to the current flow in the various coil segments. Therefore, if, as illustrated in FIG. 4B, the vertical planes defined by the side elements S1' and S2' form an angle of $\theta = 45°$, the resulting magnetic fields generated are defined by magnetic fields $x'$ and $y'$ at an angle of 90° therebetween. While the orthogonal magnetic fields defined by the $x'$, $y'$ and $z$ magnetic fields of the configuration illustrated in FIG. 4B do not correspond in direction with the orthogonal magnetic fields of the core configuration of FIG. 1, it is apparent that the fields produced by the configuration of 4B provide the capability of detecting concealed metal objects substantially regardless of orientation of the objects.

It is also therefore apparent that the coil configurations of FIGS. 4A and 4B eliminate the need for the coil configuration YC illustrated in FIG. 1.

Figure 5:
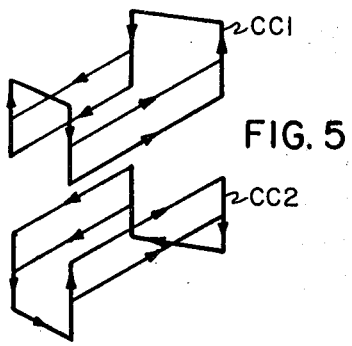

A variation of the basic ladder coil configuration of FIG. 1 for application in monitoring parcels for detection of metal objects is illustrated schematically in FIG. 5. The arrangement illustrated in FIG. 5 consists of oppositely inverted U-shaped coil configurations CC1 and CC2 defining a passageway through which parcels are transported. Inasmuch as metal present in the shoes of an airline passenger is not a consideration in this application, the coil configuration utilized can completely enclose the object to be examined. The coil configuration of FIG. 5 can be implemented to reflect a combination of the ladder coil configuration and a separate set of $y$ component coils as illustrated in FIG. 1, or can utilize the coil configuration of FIGS. 3, 4A and 4B to provide the $x$, $y$ and $z$ magnetic fields.

Figure 6A:
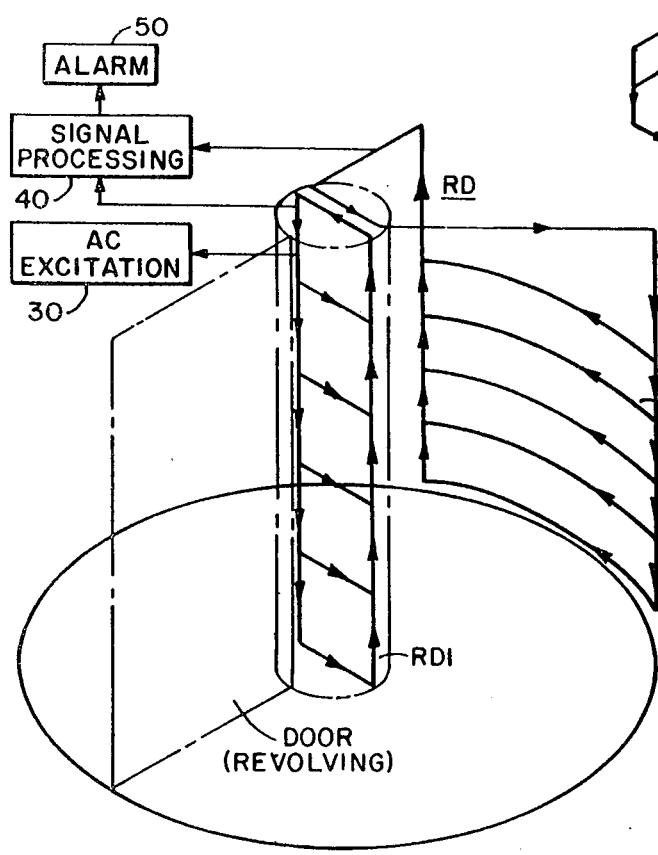
FIGS. 6A and 6B illustrate a revolving door embodiment of the invention of FIG. 1.
Figure 6B:
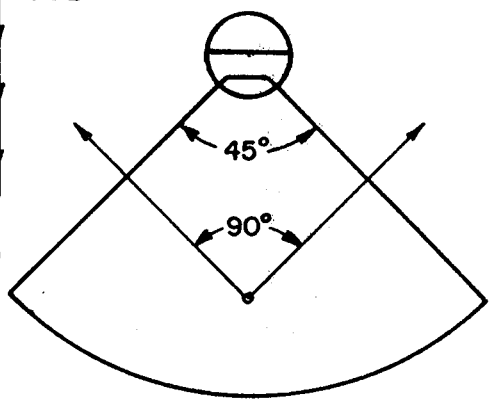

Referring to FIGS. 6A and 6B, there is schematically illustrated an application of the coil configuration of FIGS. 4A and 4B in a revolving door. Such an application would prove useful in monitoring individual entry of a particular area or building. The coil configuration RD of FIG. 6A consists of coil segments RD1 and RD2. The ladder coil segment RD1 is positioned in the center structure of the revolving door while the ladder coil segment RD2 extends across the top of the revolving door structure and down the outer wall of the revolving door structure. As in the case of the application illustrated in FIG. 1, no coil elements are positioned in the base of the revolving door structure in order to eliminate the intereference produced by metal associated with shoes. In accordance with the embodiment illustrated in FIGS. 4A and 4B, the design of the coil configuration RD is such as to define the angle 45° as illustrated in the top view of the coil configuration RD in FIG. 6B to produce the orthogonal $x$ and $y$ magnetic fields. The z magnetic field as indicated above is generated by the horizontal ladder segments of the coil elements RD1 and RD2. While an integral coil segment can be utilized to satisfy the requirements for the revolving door application, the separation of the coil configuration RD into two coil elements RD1 and RD2 and the utilization of separate excitation circuits with the respective coil segments permits independent control of the current flow through the respective coil segments. The capability of adjusting the current flow through the respective coil segments permits adjustment of the position of the magnetic fields and location of the points at which the field goes to zero within the passageway defined by the coil configuration RD.

The capability of developing different field strengths by varying the applied current permits shifting of the points of zero magnetic field from the critical center section of the passage where most people walk to a less critical area near the center post of the door.

In addition to using separate excitation sources to develop different field strengths in the respective coil segments, the same result can be achieved by using a single common excitation source while varying the number of turns comprising the respective coil segments.

These techniques for shifting the points of zero magnetic field are equally applicable to the coil configurations of FIGS. 1–5. It was determined experimentally that the difference in field strengths resulting from coil elements H1, H3, H5, H7 and H9 of 9 turns and coil elements H2, H4, H6, H8 and H10 of 12 turns was sufficient to shift the zero point of the z magnetic field of FIG. 1 away from the center of the passageway.

We claim:

1. A metal detection system, comprising, a trapezoidal coil comprised of one or more turns of primary and secondary windings, said trapezoidal coil being in the form of an inverted U to form a passageway adapted to support the movement of an object or person therethrough, one of the non-parallel sides of said trapezoidal coil forming an inverted U and defining a vertical plane, said inverted U corresponding to the entrance arch of said passageway, the second of said non-parallel sides forming a second inverted U and defining a vertical plane and corresponding to the exit arch of said passageway, the parallel ends of said trapezoidal coil corresponding to the opposite side of the passageway and defining a horizontal plane, an AC excitation means connected to the primary winding to establish a circuit flow to develop magnetic fields perpendicular to the vertical planes defined by the non-parallel sides of the trapezoidal coil and a magnetic field perpendicular to the horizontal plane defined by the parallel ends of the trapezoidal coil, and measuring means connected to said secondary winding to monitor changes in said magnetic fields in response to the presence of metal associated with an object or person in said passageway.

2. A metal detection system as claimed in claim 1 wherein the included angle between the vertical planes defined by the non-parallel sides of the trapezoidal coil is approximately 90°.

3. A metal detection system as claimed in claim 1 wherein said magnetic fields are mutually orthogonal.

4. In a metal detection system as claimed in claim 1 including one or more additional trapezoidal coils, the length of the non-parallel sides of each of the additional trapezoidal coils being different, each additional trapezoidal coil forming an inverted U similar to that of the first trapezoidal coil and positioned relative to the first trapezoidal coil such that the non-parallel sides of each additional trapezoidal coil form vertical planes and entrance and exit arches corresponding substantially to the vertical planes and entrance and exit arch of said first trapezoidal coil, the parallel ends of each additional trapezoidal coil corresponding to opposite sides of said passageway and defining horizontal planes vertically displaced from the horizontal plane defined by the parallel ends of the first trapezoidal coil by a vertical distance determined by the length of the non-parallel sides of the additional trapezoidal coil, said AC excitation means being connected to the primary winding of each additional trapezoidal coil and the said measuring means being connected to the secondary winding of each additional trapezoidal coil, the additional vertical magnetic fields developed by the parallel ends of the additional trapezoidal coils increasing the metal detection systems capability of responding to metal at various vertical locations within said passageway.

5. A metal detection system as claimed in claim 4 wherein separate AC excitation means are connected to the primary winding of each trapezoidal coil in order to supply different levels of current flow through the respective trapezoidal coils to thereby vary the strength of the magnetic field developed by the respective trapezoidal coils.

6. A metal detection system as claimed in claim 4 wherein the number of turns of primary and secondary windings in each trapezoidal coil are varied in order to vary the strength of the magnetic fields developed by the respective trapezoidal coils.

7. A metal detection system as claimed in claim 1 including a second trapezoidal coil in the form of a non-inverted U with said non-parallel sides defining vertical planes in forming an entrance and exit in said passageway and said parallel ends of said second trapezoidal coil corresponding to the opposite sides of said passageway and defining a horizontal plane, an AC excitation means being connected to the primary of said second trapezoidal coil and a measuring circuit being connected to the secondary winding of said second trapezoidal coil.

* * * * *